United States Patent
Lechner et al.

(10) Patent No.: US 10,429,216 B2
(45) Date of Patent: Oct. 1, 2019

(54) CONTROL CIRCUIT AND METHOD FOR QUALIFYING A FAULT FOR A SYNCHRONOUS MACHINE

(71) Applicant: Robert Bosch GmbH, Stuttgart (DE)

(72) Inventors: Benjamin Lechner, Neuhausen (DE); Daniel Raichle, Vaihingen (DE); Daniel Zirkel, Wiernsheim-Serres (DE); Michael Ungermann, Darmstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/737,392

(22) PCT Filed: Jun. 13, 2016

(86) PCT No.: PCT/EP2016/063464
§ 371 (c)(1),
(2) Date: Dec. 18, 2017

(87) PCT Pub. No.: WO2016/202727
PCT Pub. Date: Dec. 22, 2016

(65) Prior Publication Data
US 2018/0172490 A1 Jun. 21, 2018

(30) Foreign Application Priority Data
Jun. 18, 2015 (DE) .................. 10 2015 211 255

(51) Int. Cl.
*G01D 18/00* (2006.01)
*G01D 3/08* (2006.01)
*G01D 5/14* (2006.01)
(52) U.S. Cl.
CPC .......... *G01D 18/008* (2013.01); *G01D 3/08* (2013.01); *G01D 5/14* (2013.01); *G01D 18/00* (2013.01); *H02P 2207/05* (2013.01)

(58) Field of Classification Search
CPC .......... G01D 18/008; G01D 3/08; G01D 5/14; G01D 18/00; H02P 2207/05
(Continued)

(56) References Cited

U.S. PATENT DOCUMENTS 6,515,446 B1 * 2/2003 Koide .................. B60L 3/0038
318/700
2007/0248337 A1 * 10/2007 Ling ........................ H02P 6/34
388/811

(Continued)

FOREIGN PATENT DOCUMENTS

CN 101595633 A 12/2009
DE 102011004751 A1 8/2012
(Continued)

OTHER PUBLICATIONS

International Search Report for Application No. PCT/EP2016/063464 dated Jul. 25, 2016 (English Translation, 3 pages).

*Primary Examiner* — Jorge L Carrasquillo
*Assistant Examiner* — Devon A Joseph
(74) *Attorney, Agent, or Firm* — Michael Best & Friedrich LLP

(57) ABSTRACT

The invention provides a control circuit and a method for qualifying a fault for a synchronous machine. The control circuit (10; 110; 210) is designed with: a rotor position angle range determination device (12; 112; 212) which is designed to determine at least one rotor position angle range covered by a rotor of the synchronous machine; a diagnostic signal determination device (14; 114; 214) which is designed to determine at least one diagnostic signal value of a diagnostic signal which indicates a fault; a comparison device (16; 116; 216) which is designed to determine whether a predetermined diagnostic threshold (56) is exceeded by the at least one determined diagnostic signal value or a diagnostic signal value derived from the at least one diagnostic signal value;

(Continued)

and a qualification device (18; 118; 218) which is designed to qualify the fault, which is indicated by the diagnostic signal, on the basis of the at least one covered rotor position angle range and the exceeding of the predetermined diagnostic threshold (56) by the diagnostic signal value or the derived diagnostic signal value.

10 Claims, 6 Drawing Sheets

(58) Field of Classification Search
USPC .......................................................... 318/721
See application file for complete search history.

(56) References Cited

U.S. PATENT DOCUMENTS

| | | | |
|---|---|---|---|
| 2009/0091866 A1* | 4/2009 | Inoue | F16H 61/12 |
| | | | 361/23 |
| 2014/0055059 A1* | 2/2014 | Uryu | H02P 27/06 |
| | | | 318/9 |
| 2014/0225596 A1* | 8/2014 | Nakamura | G01R 33/07 |
| | | | 324/207.2 |
| 2015/0134284 A1 | 5/2015 | Negre | |
| 2017/0293862 A1* | 10/2017 | Kamiya | G01M 15/02 |

FOREIGN PATENT DOCUMENTS

| | | |
|---|---|---|
| DE | 102011075238 | 11/2012 |
| DE | 102011089547 | 6/2013 |
| EP | 1004474 | 5/2000 |
| EP | 1503184 | 2/2005 |

\* cited by examiner

CONTROL CIRCUIT AND METHOD FOR QUALIFYING A FAULT FOR A SYNCHRONOUS MACHINE

BACKGROUND OF THE INVENTION

The present invention relates to a control circuit and a method for qualifying a fault for a synchronous machine, in particular a permanently excited synchronous machine or an electrically excited synchronous machine.

The knowledge of the rotor position angle is necessary to control permanently excited synchronous machines and electrically excited synchronous machines, as said machines are, for example, used in hybrid and electric vehicles. This is also denoted in short as the rotor angle and bears the mathematical symbol $\varphi_{el}$. In order to determine the rotor position angle, different types of sensors are known, for example digital angle sensors, resolvers or sensors on the basis of the eddy current effect.

In order to monitor the function of such sensors, diagnostic signals are typically generated, wherein a fault is indicated when a predetermined diagnostic threshold is exceeded. As a result, short-term outliers can occur, i.e. irrelevant peaks in the diagnostic signal. In order to prevent an erroneous qualification of a fault, diagnostic signals are conventionally debounced temporally, i.e. on a time basis, debounced. During the time-based debouncing, a fault is qualified, i.e. an actual fault is recognized, if the diagnostic signal lay without interruption above a diagnostic threshold. Diagnostic signals are also called diagnostic comparison signals.

In the European patent application EP 1004474, a method and a circuit arrangement for comparing an input signal with different voltage thresholds in an electronic flasher unit are described, wherein a temporal debouncing of an output signal is carried out.

SUMMARY OF THE INVENTION

The present invention discloses a control circuit and a method.

According to that, a control circuit for qualifying a fault for a synchronous machine is provided having: a rotor position angle range determination device which is designed to determine at least one rotor position angle range covered by a rotor of the synchronous machine; a diagnostic signal determination device which is designed to determine at least one diagnostic signal value of a diagnostic signal which indicates a fault; a comparison device which is designed to determine whether a predetermined diagnostic threshold is exceeded by the at least one determined diagnostic signal or a diagnostic signal value derived from the at least one diagnostic signal value; and a qualification device which is designed to qualify the fault, which is indicated by the diagnostic signal, on the basis of the at least one covered rotor position angle range and the exceeding of the predetermined diagnostic threshold by the diagnostic signal value or the derived diagnostic signal value.

By the exceeding of a threshold by a value, it should be understood that the value is greater than a threshold value associated with the threshold. The exceeding of the threshold can, however, also mean that the value is smaller than the threshold value, depending on whether the threshold is defined as the upper or as the lower threshold.

By a qualification or debouncing of a fault, a confirming assessment of the fault, i.e. a verification of a fault indicated by a diagnostic signal, as an actually occurring fault is to be understood.

The invention furthermore provides a method for qualifying a fault for a synchronous machine comprising the steps: determining of at least one rotor position angle range covered by the rotor of a synchronous machine; determining, while the rotor passes through the rotor position angle range, at least one diagnostic signal value of a diagnostic signal which indicates a fault; determining whether a predetermined diagnostic threshold is exceeded by the at least one determined diagnostic signal value or a diagnostic signal value derived from said at least one diagnostic signal value; and qualifying of the fault, which is indicated by the diagnostic signal, on the basis of the at least one covered rotor position angle range and the exceeding of the predetermined diagnostic threshold by the diagnostic signal value or the derived diagnostic signal value.

Finally, the invention also provides a synchronous machine having a control circuit according to the invention.

The insight underlying the invention is that some faults which occur in synchronous machines occur only at certain positions of the electric drive or respectively the rotor and manifest themselves in different ways in the diagnostic signals. There are also particularly rotor positions of the rotor, at which a certain fault does not manifest itself in the diagnostic signal. On the other hand, certain diagnostic signals can be determined only one per electric period. In this case, a time-based debouncing is ineffective because already a single exceeding of the diagnostic threshold by the diagnostic signal can lead to the qualification of the fault independently of the applied debouncing duration.

The concept underlying the present invention is to take this insight into account and a to provide a debouncing, i.e. a qualification of a fault, based on a diagnostic threshold being exceeded by a diagnostic signal as well as based on a covered rotor angle.

Advantageous embodiments and modifications ensue from the dependent claims as well as from the description with reference to the figures in the drawings.

According to one advantageous modification, the diagnostic signal determination device is designed to continually determine the diagnostic signal value while the rotor covers the at least one rotor position angle range, wherein the control circuit has an integration device which is designed to calculate an integral over a covered rotor position angle within the at least one rotor position angle range with a constant as integrand as long as the continually determined diagnostic signal value exceeds the predetermined diagnostic threshold and wherein the qualification device is designed to qualify the fault in the event that the integral exceeds a predetermined value. The constant can, for example, be one.

According to another advantageous modification, the integration device is configured to set the integral to zero as soon as the diagnostic signal value no longer exceeds the predetermined threshold value. Alternatively, the integration device is configured to set the integral to zero as soon as the diagnostic signal value does not exceed the diagnostic threshold across a predetermined rotor position angle difference. Thus, a debouncing for the signal is provided when setting the integral to zero.

According to a further advantageous modification, the diagnostic signal determination device is designed to determine at least one diagnostic signal value of the diagnostic signal for each covered rotor position angle range, the covered rotor position angle ranges being the same size, wherein the control circuit has a computing device, which is designed to generate a derived diagnostic signal value for the respective rotor position angle range based on the at least one diagnostic signal value determined for the respective covered rotor position angle range, wherein the qualification device is designed to qualify the fault in the event that the derived diagnostic signal value exceeds the predetermined diagnostic threshold for a predetermined number of rotor position angle ranges in succession.

According to an advantageous modification to the method according to the invention, the diagnostic signal value is continuously determined while the rotor covers the at least one rotor position angle range, wherein an integral is calculated over a covered rotor position angle within the at least one rotor position angle range with one as the integrand, as long as the continuously determined diagnostic signal value exceeds the predetermined diagnostic threshold, and the fault is qualified in the event that the integral exceeds a predetermined value.

According to a further advantageous modification, the integral is set to zero as soon as the diagnostic signal value no longer exceeds the predetermined diagnostic threshold. Alternatively, the integral is set to zero as soon as the diagnostic signal value does not exceed the predetermined diagnostic threshold over a predetermined rotor position angle distance.

According to a further advantageous modification, at least one diagnostic signal value of the diagnostic signal is determined for each covered rotor position angle range, the covered rotor position angle ranges being the same size, wherein a derived diagnostic signal value is generated for the respective rotor position angle range on the basis of the at least one diagnostic signal value determined for the respective covered rotor position angle range; and the fault is qualified in the event that the derived diagnostic signal value exceeds the predetermined diagnostic threshold for a predetermined number of rotor position angle ranges in succession.

BRIEF DESCRIPTION OF THE DRAWINGS

The present invention is explained in greater detail below using the exemplary embodiments depicted in the schematic figures of the drawings. In the drawings.

In all of the figures, identical or respectively functionally identical elements and devices—provided nothing else is specified—are provided with the same reference signs. The numbering of method steps is done for the sake of clarity and should particularly not, provided nothing else is specified, imply a certain temporal succession. In particular, a plurality of method steps can also be carried out at the same time.

DETAILED DESCRIPTION

Figure 1:
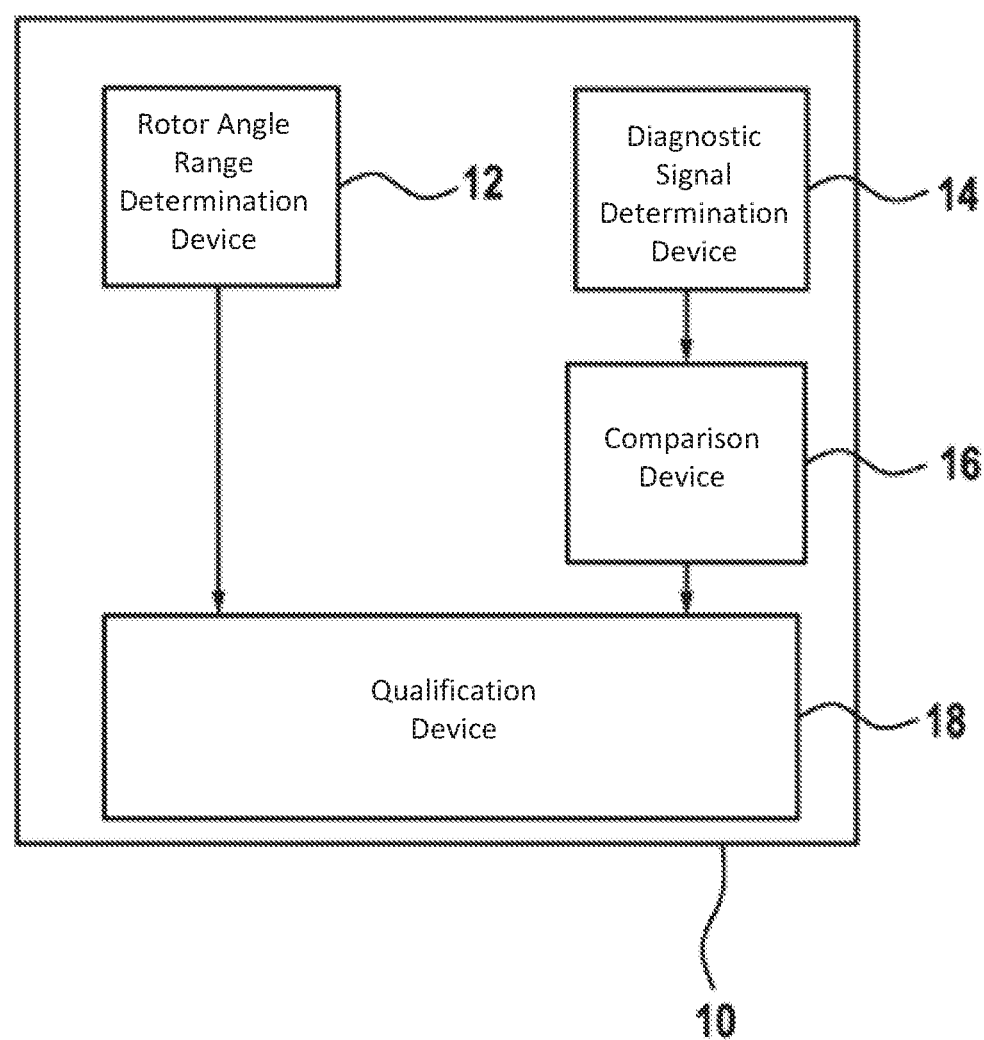
FIG. 1 shows a schematic block diagram of a control circuit 10 for qualifying a fault for a synchronous machine according to an embodiment of the present invention.

FIG. 1 shows a schematic block diagram of a control circuit 10 for qualifying a fault for a synchronous machine according to an embodiment of the present invention.

The control circuit 10 comprises a rotor angle range determination device 12 which is designed to determine at least one rotor angle range covered by a rotor of the synchronous machine. The rotor angle range determination device can, for example, be based on digital angle sensors, resolvers or sensors on the basis of the eddy current effect. In each case, a current rotor position angle can be determined, wherein the covered rotor position angle range is determined by means of the difference between two determined rotor position angles.

The control circuit 10 furthermore comprises a diagnostic signal determination device 14 which is designed to determine at least one diagnostic signal value of a diagnostic signal which indicates a fault. The fault can, for example, relate to resolver signals with an implausible amplitude ratio.

The control circuit 10 furthermore comprises a comparison device 16 which is designed to determine whether a predetermined diagnostic threshold is exceeded by the at least one determined diagnostic signal value or a diagnostic signal value derived from the at least one diagnostic signal. The derived diagnostic signal value can, for example, be a mean value or a median of a plurality of diagnostic signal values determined within a rotor position range. The predetermined diagnostic threshold can be stored in the comparison device 16 or in an additional storage device of the control circuit 10.

In addition, the control circuit 10 comprises a qualification device 18 which is designed to qualify the fault, which is indicated by the diagnostic signal, on the basis of the at least one covered rotor position angle range and the exceeding of the predetermined diagnostic threshold by the diagnostic signal value or the derived diagnostic signal value.

Figure 2:
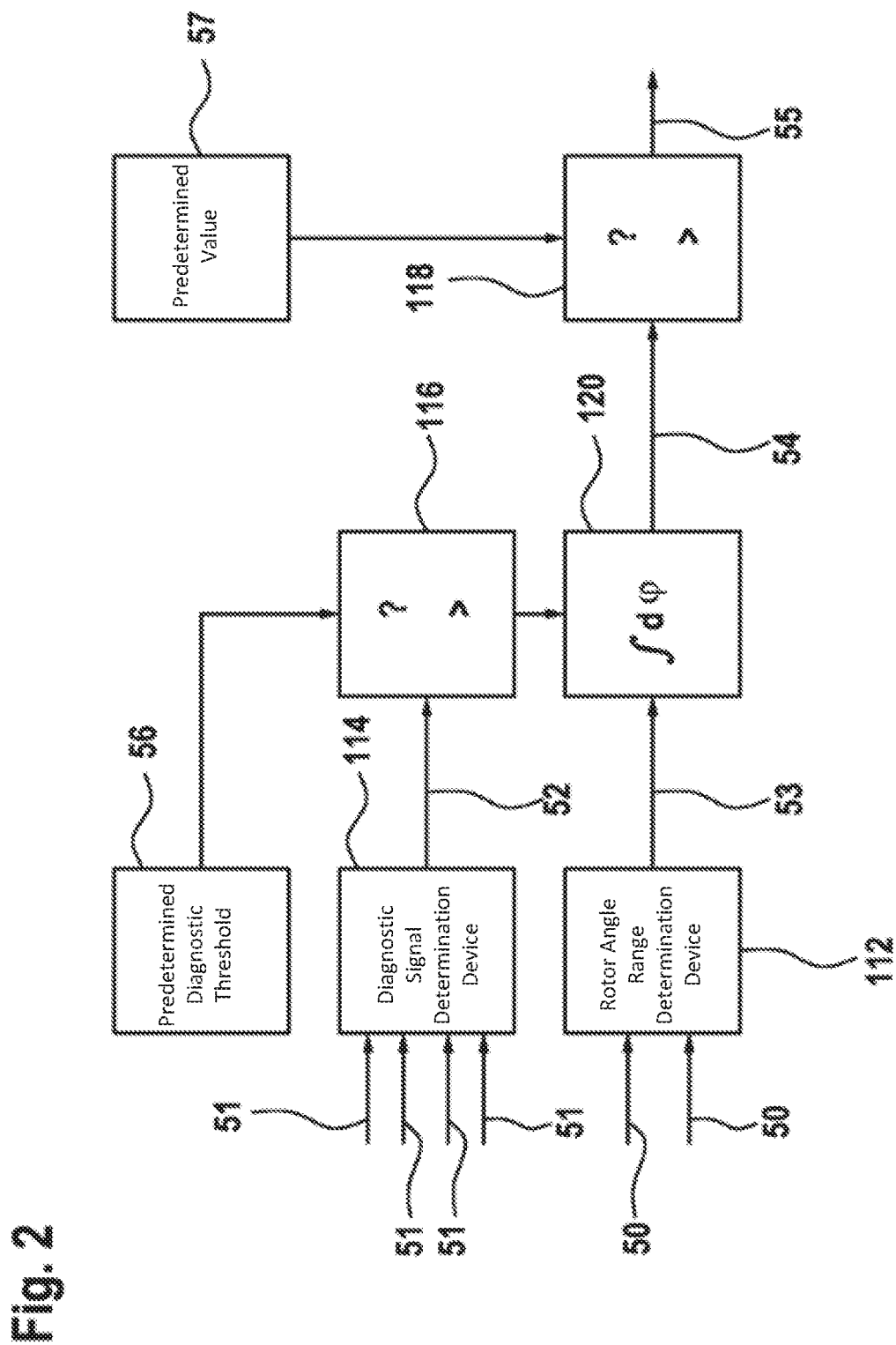
FIG. 2 shows a schematic block diagram of a control circuit 110 for qualifying a fault for a synchronous machine according to a further embodiment of the present invention.

FIG. 2 shows a schematic block diagram of a control circuit 110 for qualifying a fault for a synchronous machine according to a further embodiment of the present invention.

The control circuit 110 is a variant of the control circuit 10 and differs from said control circuit 10 particularly in the configuration of the rotor position angle range determination device 112 of the control circuit 110, in the configuration of the diagnostic signal determination device 114 of the control circuit 110, in the configuration of the comparison device 116 of the control circuit 110, in the configuration of the qualification device 118 of the control circuit 110 and by means of an integration device 120 of the control circuit 110.

The rotor position angle range determination device 112 is designed to determine at least one rotor position angle range covered by a rotor of the synchronous machine and to transmit a rotor position signal 53 on the basis of the determined covered rotor position angle range to an integration device 120 of the control circuit 110. To this end, output signals 50 of a resolver can, for example, be supplied to the rotor position angle range determination device 112, said output signals indicating current rotor position angles of the rotor.

The diagnostic signal determination device 114 is designed to continuously determine the diagnostic signal value of the diagnostic signal 52 while the rotor covers the at least one rotor angle range. A continuous determination can also be understood as a quasi-continuous, discrete determination of diagnostic signal values having a maximum possible determination frequency for the diagnostic signal determination device 114. The determination of the diagnostic signal value of the diagnostic signal 52 is based on one or a plurality of input signals 51 of the diagnostic signal determination device 114. The one or the plurality of input signals 51 can be received by sensors of the synchronous machine The comparison device 116 is designed to determine continuously or quasi-continuously whether a predetermined diagnostic threshold 56 is exceeded by the at least one determined diagnostic signal value of the diagnostic signal 52 or by a diagnostic signal value derived from the at least one diagnostic signal value.

The integration device 120 or the control circuit 110 is designed to calculate an integral over a covered rotor angle within the at least one rotor angle range with a constant, in particular one, as integrand, so long as, according to the comparison device 116, the continuously determined diagnostic signal value exceeds the predetermined diagnostic threshold 56. The calculated integral is transmitted by means of the control circuit 110 in the form of an integral signal 54 to the qualification device 118 of the control circuit 110. When calculating the integral, the covered rotor angle functions as the integration variable.

The constant used as integrand can be adapted from a predetermined number of constants as a function of the diagnostic signal value of the derived diagnostic signal value in relationship to the predetermined diagnostic threshold. A first constant can, for example, be used with a first algebraic sign, for example with a positive algebraic sign, as integrand if the diagnostic signal value or the derived diagnostic signal value is greater than or equal to the diagnostic threshold. A second constant with an algebraic sign different from the first algebraic sign, for example a negative algebraic sign, can be used as the integrand if the diagnostic signal value or the derived diagnostic signal value is less than the diagnostic threshold. The first and the second constant can have the same amount or be different from one another. Thus, the value of the integral can be automatically reduced so long as the diagnostic signal does not indicate a fault.

The qualification device 118 of the control circuit is designed to qualify the fault in the event that the calculated integral according to the integral signal 54 exceeds a predetermined value 57. This predetermined value can also be described as the debouncing threshold. The qualification device 118 is furthermore designed to output a fault signal 55 in the event that the predetermined value 57 is exceeded by the calculated integral. The fault signal 55 can, for example, be transmitted for processing to a control device, for display to a display device or for output to a loud speaker. The predetermined value 57 can be stored in the qualification device or in an additional storage device of the control circuit 110.

The integration device 120 can be configured to set the integral to be calculated to zero as soon as the diagnostic signal value of the diagnostic signal 52 no longer exceeds the predetermined diagnostic threshold.

Alternatively, the integration device 120 can be configured to set the integral to be calculated to zero as soon as the diagnostic signal value of the diagnostic signal 52 does not exceed the predetermined diagnostic threshold over a predetermined rotor angle difference and/or over a predetermined time duration. The predetermined rotor angle difference can be variably determined depending on the fault of the synchronous machine to be determined. The predetermined rotor angle difference can be stored in the integration device 120 or in an additional storage device of the control circuit 110.

Figure 3:
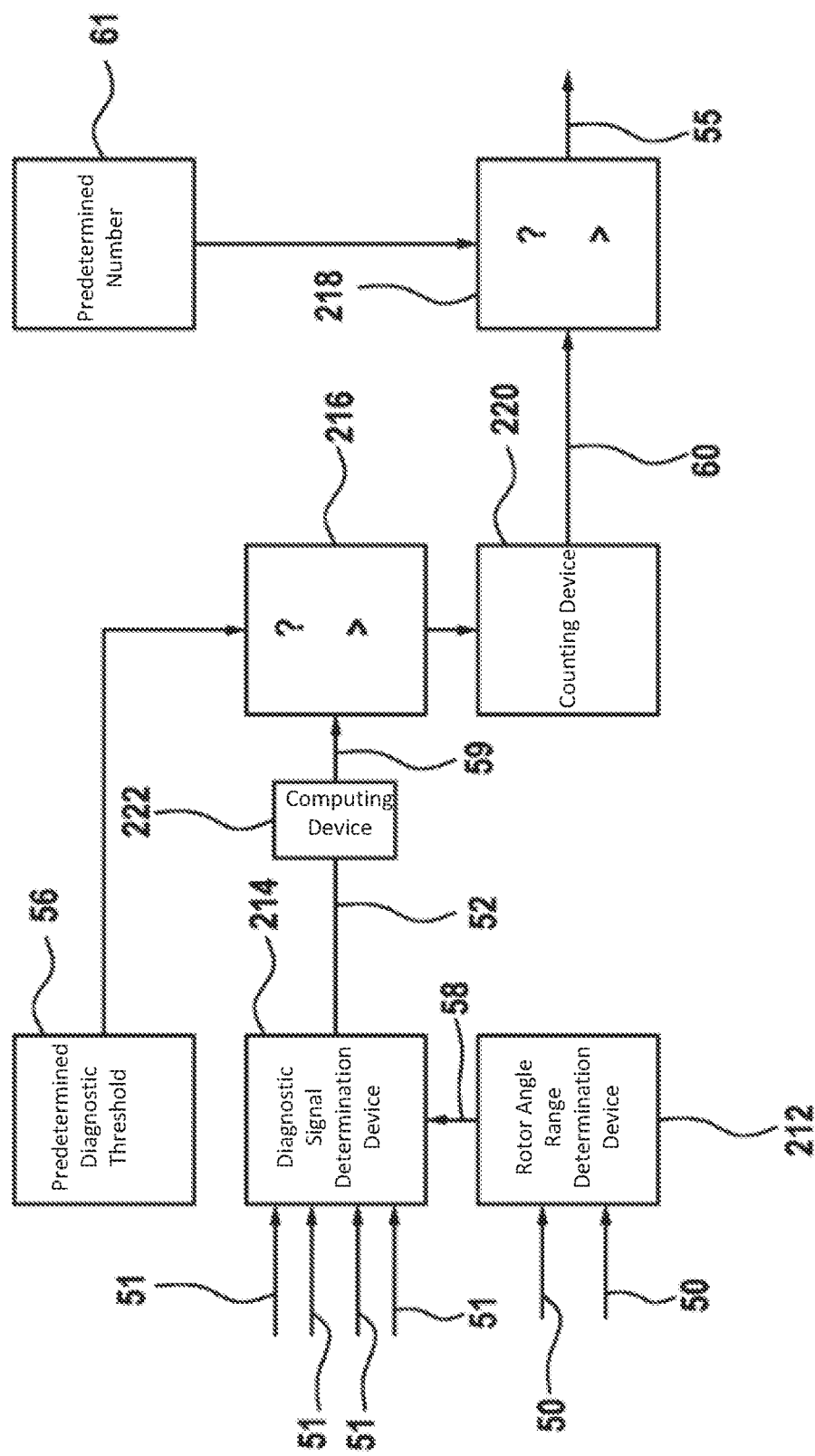
FIG. 3 shows a schematic block diagram of a control circuit 210 for qualifying a fault for a synchronous machine according to still another embodiment of the present invention.

FIG. 3 shows a schematic block diagram of a control circuit 210 for qualifying a fault for a synchronous machine according to still another embodiment of the present invention.

The control circuit 210 is a variant of the control circuit 110 and differs from the latter particularly in the configuration of the rotor position angle range determination device 212 of the control circuit 210, in the configuration of the diagnostic signal determination device 214 of the control circuit 210, in the configuration of the comparison device 216 of the control circuit 210, in the configuration of the qualification device 218 of the control circuit 210 and by a computing device 222 and a counting device 220 of the control circuit 210.

The diagnostic signal determination device 214 is designed to determine at least one diagnostic signal value, in particular a predetermined number of diagnostic signal values, of the diagnostic signal 52 for each covered rotor position angle range, the covered rotor position angle ranges preferably being the same size. This can, for example, be achieved by the fact that a determination frequency, with which the diagnostic signal determination device 214 determines the diagnostic signal value of the diagnostic signal 52, is adapted to a known or estimated rotational speed of the rotor. Alternatively or additionally, an information signal 58 can be transmitted to the diagnostic signal determination device 214 by means of the rotor position angle range determination device 212, on the basis of which signal the diagnostic signal determination device 214 determines the at least one diagnostic signal value of the diagnostic signal 52, in particular the predetermined number of diagnostic signal values.

The equally large rotor position angle ranges can be determined depending on a fault to be qualified and can be selected from a fraction of an electrical period, which corresponds to a rotor position angle range of three hundred sixty degrees, up to a whole-numbered or fraction-numbered multiple of the electric period of the synchronous machine. The equally large rotor position angle ranges are selected such that the respective fault, if said fault actually occurs, can be measured per rotor position angle range exactly once or at least once.

The control circuit 210 has a computing device 222 which is designed to, based on the at least one diagnostic signal value of the diagnostic signal 52 determined for the respective covered rotor position angle range, generate exactly one derived diagnostic signal value for the respective rotor position angle range. The derived diagnostic signal value can be equal to the determined diagnostic signal value, in particular if only a single diagnostic signal value was determined in a concrete rotor position angle range.

The computing device 222 can be designed to determine a mean value or a median of the determined diagnostic signal values as the derived diagnostic signal value. The derived diagnostic signal value is further transmitted by the computing device 222 in a derived diagnostic signal 59 to the comparison device 216 of the control circuit 210.

The control circuit 210 has a counting device 220, which is designed to count how often in succession the derived diagnostic signal value of the derived diagnostic signal 59 exceeds the predetermined diagnostic threshold 56. The number of the derived diagnostic signal values which exceed in succession the predetermined diagnostic threshold 56 is transmitted by the counting device 220 in a counting signal 60 to the qualification device 218 of the control circuit 210.

The qualification device 218 is designed to qualify the fault in the event that the derived diagnostic signal value, for a predetermined number 61 of rotor position angle ranges in succession, exceeds the predetermined diagnostic threshold 56. In other words, the qualification device 218 outputs the fault signal 55 if derived diagnostic signal values of the diagnostic signal value 59 in the predetermined number 61 in succession exceed the predetermined diagnostic threshold 56. The predetermined number 61 can be stored in the qualification device 218 or in an additional storage device of the control circuit 210.

Figure 4:
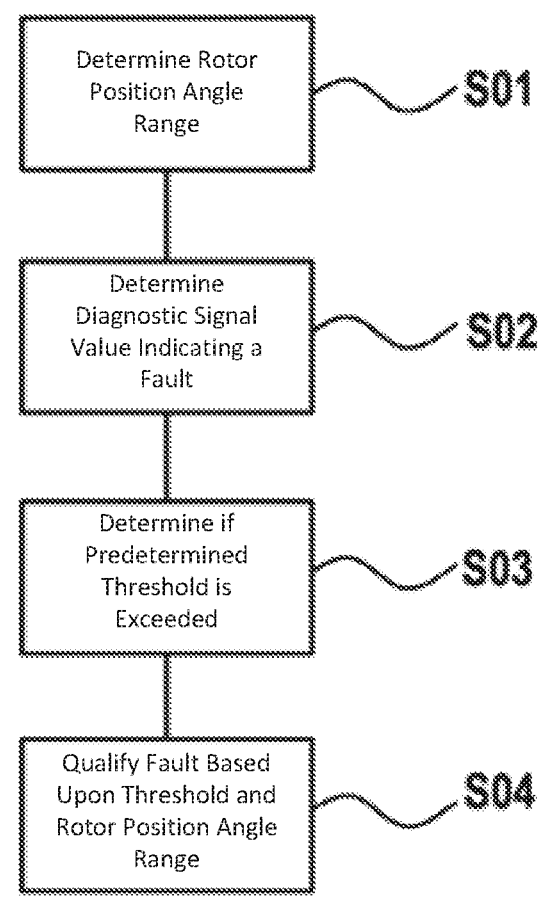
FIG. 4 shows a schematic flow diagram for explaining a method for qualifying a fault for a synchronous machine according to a further embodiment of the present invention.

FIG. 4 shows a schematic flow diagram for explaining a method for qualifying a fault for a synchronous machine according to a further embodiment of the present invention.

The method according to FIG. 4 is suitable for use with a control circuit 10; 110; 210 according to the invention and can be advantageously adapted in accordance with all variants and modifications described in reference to the control circuit according to the invention.

In step S01, at least one rotor position angle range covered by a rotor of the synchronous machine is determined, for example by means of the rotor position angle range determination device 12; 112; 212 of the control circuit 10; 110; 210.

In step S02, at least one diagnostic signal value of a diagnostic signal 52 which indicates a fault is determined while the rotor passes through the rotor position angle distance, for example by means of the diagnostic signal determination device 14; 114; 214 of the control circuit 10; 110; 210.

In step S03, it is determined whether a predetermined diagnostic threshold 56 is exceeded by at least one determined diagnostic signal value or a diagnostic signal value derived from the at least one diagnostic signal value.

In step S04, the fault which is indicated by the diagnostic signal is qualified on the basis of the at least one covered rotor position angle range and the exceeding of the predetermined diagnostic threshold by the diagnostic signal value or the derived diagnostic signal value.

Figure 5:
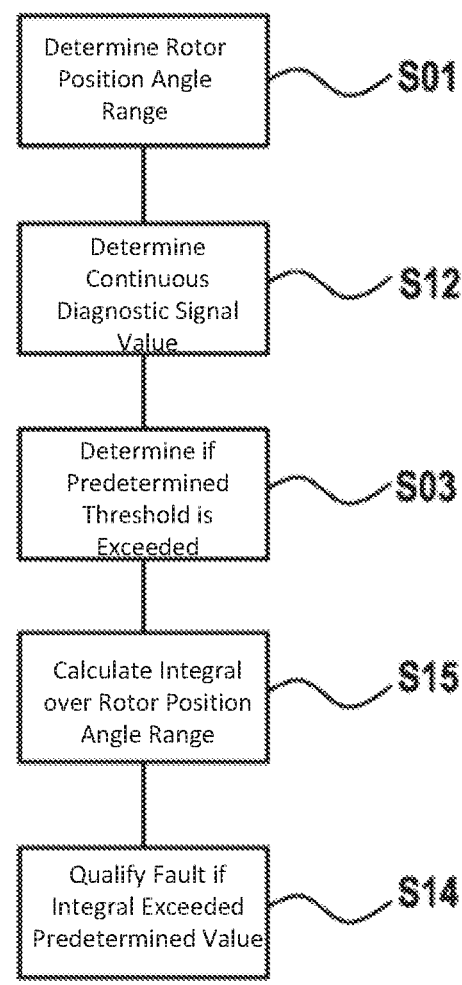
FIG. 5 shows a schematic flow diagram for explaining a method for qualifying a fault for a synchronous machine according to yet another embodiment of the present invention.

FIG. 5 shows a schematic flow diagram to explain a method for qualifying a fault for a synchronous machine according to yet another further embodiment of the present invention.

The method according to FIG. 5 is a variant of the method according to FIG. 4 and is suitable for use with a control circuit 110 according to the invention and can be advantageously adapted in accordance with all variants and modifications described with regard to the control circuit 110 according to the invention.

In the method according to FIG. 5, the diagnostic signal value, while the rotor covers the at least one rotor position angle range, is determined continuously or quasi-continuously in step S12. In step S15, an integral is calculated over a covered rotor position angle within the at least one rotor position angle range with one as integrand as long as the continuously determined diagnostic signal value exceeds the predetermined diagnostic threshold 56. In step S14, the fault is qualified in the event that the integral exceeds a predetermined value 57. Setting the integral to zero can take place according to an alternative described with regard to the control circuit 110.

Figure 6:
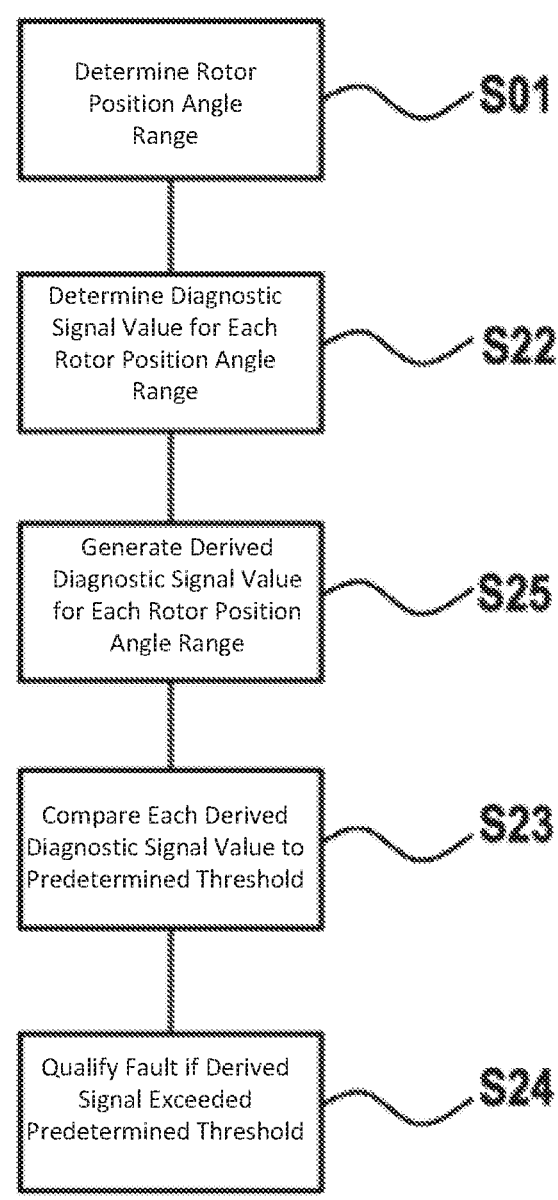
FIG. 6 shows a schematic flow diagram for explaining a method for qualifying a fault for a synchronous machine according to a further embodiment of the present invention.

FIG. 6 shows a schematic flow diagram for explaining a method for qualifying a fault for a synchronous machine according to a further embodiment of the present invention.

The method according to FIG. 6 is a variant of the method according to FIG. 4 and is suitable for use with a control circuit 210 according to the invention and can be advantageously adapted in accordance with all variants and modifications described with regard to the control circuit 210 according to the invention.

In step S22, at least one diagnostic signal value of the diagnostic signal 52 is determined for each covered rotor position angle range, the covered rotor position angle ranges being the same size. In step S25, a derived diagnostic signal value is generated for the respective rotor position angle range on the basis of the at least one diagnostic signal value determined for the respective covered rotor position angle range. In step S23, each derived diagnostic signal value is compared with the predetermined diagnostic signal value 56. In step S24, the fault is qualified in the event that the derived signal value exceeds the predetermined diagnostic threshold 56 for a predetermined number 61 of rotor position angle ranges in succession.

Although the present invention was described above using preferred exemplary embodiments, it is not limited thereto but can be modified in a variety of ways. The invention can be particularly be changed or modified in multiple ways without deviating from the essence of the invention.

For example, a time-based debouncing can be performed in addition to the inventive debouncing on the basis of the covered rotor position angle range, i.e. the fault must be qualified a further time in a time-based manner before the fault signal is outputted by the control circuit.

The invention claimed is:

1. A control circuit for qualifying a fault for a synchronous machine, comprising:
   a rotor position angle range determination device which is designed to determine at least one rotor position angle range covered by a rotor of the synchronous machine;
   a diagnostic signal determination device which is designed to determine at least one diagnostic signal value of a diagnostic signal which indicates a fault, wherein the diagnostic signal determination device is designed to continually determine the diagnostic signal value while the rotor covers the at least one rotor position angle range;
   a comparison device which is designed to determine whether a predetermined diagnostic threshold is exceeded by the at least one determined diagnostic signal value or a derived diagnostic signal value derived from the at least one diagnostic signal value;
   a qualification device which is designed to qualify the fault, which is indicated by the diagnostic signal, on the basis of the at least one covered rotor position angle range and the exceeding of the predetermined diagnostic threshold by the diagnostic signal value or the derived diagnostic signal value; and
   an integration device configured to calculate an integral over a covered rotor position angle within the at least one rotor position angle range with one as the integrand as long as the continually determined diagnostic signal value exceeds the predetermined diagnostic threshold.

2. The control circuit according to claim 1, wherein the qualification device is designed to qualify the fault in the event that the integral exceeds a predetermined value.

3. The control circuit according to claim 1, wherein the integration device is configured to set the integral to zero as soon as the diagnostic signal value no longer exceeds the predetermined diagnostic threshold.

4. The control circuit according to claim 1,
wherein the integration device is configured to set the integral to zero as soon as the diagnostic signal value has not exceeded the predetermined diagnostic threshold over a predetermined rotor position angle difference.

5. The control circuit according to claim 1,
wherein the diagnostic signal determination device is designed to determine at least one diagnostic signal value of the diagnostic signal for each covered rotor position angle range; the covered rotor position angle ranges being the same size;
wherein the control circuit comprises a computing device, which is designed, on the basis of the at least one diagnostic signal value determined for the respective covered rotor position angle range, to generate a derived diagnostic signal value for the respective rotor position angle range;
wherein the qualification device is designed to qualify the fault in the event that the derived diagnostic signal value exceeds the predetermined diagnostic threshold for a predetermined number of rotor position angle ranges in succession.

6. A method for qualifying a fault for a synchronous machine comprising the following steps:
determining at least one rotor position angle range covered by a rotor of the synchronous machine;
determining at least one diagnostic signal value of a diagnostic signal which indicates a fault, while the rotor passes through the rotor position angle distance, wherein the diagnostic signal value is continually determined while the rotor covers the at least one rotor position angle range;
determining whether a predetermined diagnostic threshold is exceeded by the at least one determined diagnostic signal value or a diagnostic signal value derived from the at least one diagnostic signal value, wherein an integral is calculated over a covered rotor position angle within the at least one rotor position angle range with one as the integrand as long as the continually determined diagnostic signal value exceeds the predetermined diagnostic threshold; and
qualification of the fault, which is indicated by the diagnostic signal, on the basis of the at least one covered rotor position angle range and the exceeding of the predetermined diagnostic threshold by the diagnostic signal value or the derived diagnostic signal value.

7. The method according to claim 6,
wherein the fault is qualified in the event that the integral exceeds a predetermined value.

8. The method according to claim 6,
wherein the integral is set to zero as soon as the diagnostic signal value no longer exceeds the predetermined diagnostic threshold.

9. The method according to claim 6,
wherein the integral is set to zero, as soon as the diagnostic signal value has not exceeded the predetermined diagnostic threshold over a predetermined rotor position angle distance.

10. The method according to claim 6,
wherein at least one diagnostic signal value of the diagnostic signal is determined for each covered rotor position angle range; the covered rotor position angle ranges being the same size;
wherein on the basis of the at least one diagnostic signal value determined for the respective covered rotor position angle range, a derived diagnostic signal value is generated for the respective rotor position angle range;
wherein the fault is qualified in the event that the derived diagnostic signal value exceeds the predetermined diagnostic threshold for a predetermined number of rotor position angle ranges in succession.

* * * * *